(12) United States Patent
Gladnick et al.

(10) Patent No.: US 6,498,684 B1
(45) Date of Patent: Dec. 24, 2002

(54) APPARATUS AND METHOD FOR INDICATING THE LOCATION OF A FIELD OF VIEW FOR A VISION SYSTEM

(75) Inventors: Paul G. Gladnick, Seattle, WA (US); Charles R. Blanford, Kingston, WA (US); Seiji Shimokama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 106 days.

(21) Appl. No.: 09/688,180

(22) Filed: Oct. 16, 2000

(51) Int. Cl.[7] .............................................. G02B 27/10
(52) U.S. Cl. ...................................................... 359/618
(58) Field of Search .......................................... 359/618

(56) References Cited

U.S. PATENT DOCUMENTS 5,308,972 A * 5/1994 Nagano et al. ............. 250/216
5,548,354 A * 8/1996 Kasahara et al. ........... 351/206

* cited by examiner

Primary Examiner—Ricky Mack
(74) Attorney, Agent, or Firm—Oliff & Berridge, PLC

(57) ABSTRACT

A method and apparatus for locating the field of view of an imaging or vision system by generating an indicator light using at least one of the one or more light sources of the imaging system. The indicator light is transmitted along a projection path. The indicator light is output along the projection path onto the workpiece in a region adjacent to the field of view of the imaging system.

24 Claims, 4 Drawing Sheets

APPARATUS AND METHOD FOR INDICATING THE LOCATION OF A FIELD OF VIEW FOR A VISION SYSTEM

BACKGROUND OF THE INVENTION

1. Field of Invention

This invention relates to vision systems or other imaging systems.

2. Description of Related Art

Measurements performed with a vision system involve some form of interaction between the operator of the vision system and the vision system. The operator can interact with the vision system at several levels. One particular interaction occurs when the operator sets up an object to be viewed by the vision system. The vision system images the object using an optical system and an image acquisition device and displays the acquired image. Often during setup, the operator must change, either manually or automatically, one or more of the magnification levels of the vision system, the location of the optical system relative to the object and/or the objects and/or the amount of light used to illuminate the object.

SUMMARY OF THE INVENTION

To acquire specific images of an object at various magnifications may require the physical location of the optical system field of view relative to the object be determined. One conventional way to determine the location of the optical system field of view relative to the object is to observe the shape of the portion of the object imaged by the optical system. However, determining the location of the field of view relative to the object by observing the shape of the portion of the object imaged by the optical system alone can be especially difficult when the vision system views the object at high magnification levels, and especially when there are several similar shapes on the object.

Another conventional way to determine the location of the optical system field of view relative to the object includes visually observing and gauging the location of the optical microscope axis in relation to the workpiece. However, determining the location of the optical system field of view relative to the object by solely observing the location of the center of the optical microscope axis in relation to the workpiece is also especially difficult when the vision system views the object at high magnification levels.

Yet another way to determine the location of the optical system field of view relative to the object includes illuminating the field of view orthogonally with bright field lighting and observing the location of a small-diameter light spot on the object. However, bright field light of a sufficient level to produce adequate light scattering intended for observation by the human eye normally saturates the vision system's image acquisition device. This precludes simultaneously viewing any image details produced by the image acquisition device, thus making it difficult to determine the location of the optical system relative to the object.

Still another way to determine the location of the optical system relative to the object is to diffusely illuminate the object using dark-field lighting such as a ring light. However, the disproportionately large illumination field thereby produced relative to the image acquisition device viewing field makes it difficult to determine the location on the object of the optical system field of view.

This invention provides systems and methods for indicating the field of view of an optical system on the workpiece so that the indication can be viewed by the human eye.

This invention separately provides systems and methods that indicate the field of view of the optical system on the workpiece while simultaneously allowing a portion of the object to be imaged by the optical system and the image acquisition device.

This invention separately provides systems and methods for indicating the field of view of the imaging system on the workpiece using some of the imaging optics of the vision system, but without interfering with the image provided by the imaging optics of the vision system.

In various exemplary embodiments of the systems and methods according to this invention, the location of the field of view of an imaging or vision system is indicated by generating an indicator light using at least one of the one or more light sources of the imaging system. The indicator light is transmitted along a projection path. The indicator light is output along the projection path onto the workpiece in a region indicative of the field of view of the imaging system.

These and other forms and advantages of this invention are described in or are apparent from the following detailed description of exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
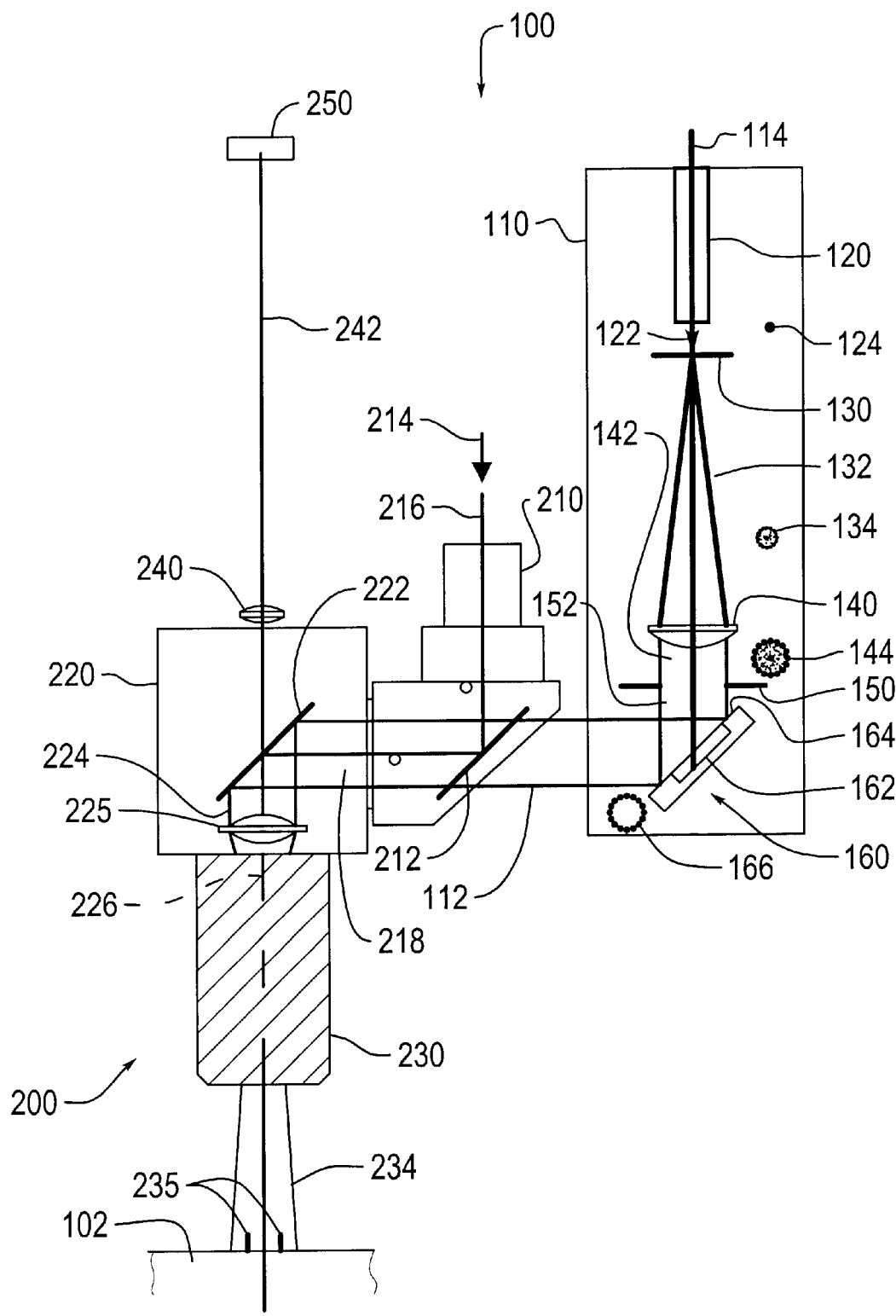
FIG. 1 is a side view of one exemplary embodiment of an imaging system that indicates the location of a field of view on a subject workpiece according to this invention.
Figure 2:
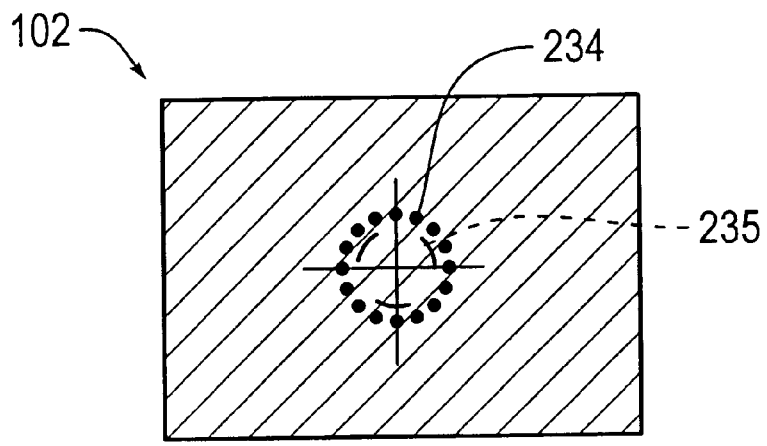
FIG. 2 is a top view of an exemplary workpiece indicating a field of view and indicator lighting according to this invention.
Figure 3:
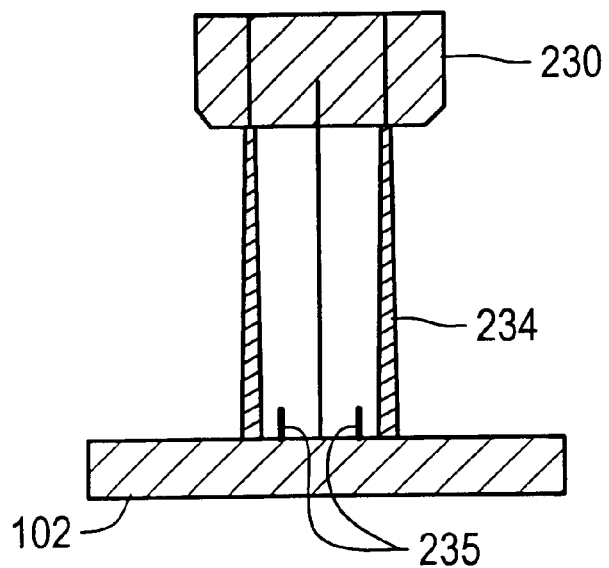
FIG. 3 is a side view corresponding to FIG. 2, and illustrates in greater detail the indicator light and the light from the workpiece within the field of view shown in FIG. 1 and FIG. 2.

FIGS. 1–3 illustrate a first exemplary embodiment of an imaging system 100 that indicates the location of a field of view 235 on a subject workpiece 102 according to this invention. As shown in FIG. 1, the imaging system 100 includes an optical system 200 and an illumination apparatus 110 that creates a beam of light 112. The illumination apparatus 110 includes a light emitting device 120 that emits a beam of light 122 along an optical axis 114. In various exemplary embodiments, the light emitting device 120 is a semiconductor laser or light emitting diode. However, it should be appreciated that the light emitting device 120 can be any currently known or later developed device or arrangement of devices that can emit electromagnetic radiation, preferably in a highly directional manner. Also in various exemplary embodiments, the illumination apparatus 110 can comprise a plurality of light emitting devices 120 in order to create a pattern for the beam of light 112 to be projected into the optical system 200.

In general, the beam of light 122 is in a region of the visible spectrum. However, any type of electromagnetic radiation that creates an indication, on an object to be viewed, of the field of view 235 of the imaging system 100 that is visible to the human eye, whether aided or unaided, can be used. Thus, if the object to be viewed fluoresces visible light under a particular type of electromagnetic radiation, or if a particular type of electromagnetic radiation can be viewed using an aid to the human eyes, such as night vision, infrared or ultraviolet glasses, the light emitting device 120 can emit that type of electromagnetic radiation. In various exemplary embodiments, the beam of light 122 is circular with a known diameter, as indicated by the cross-section 124. For illustrative purposes, the beam of light 122 will be described below as having a circular cross sectional shape. However, it should be appreciated that the beam of light 122 can be of any appropriate cross-sectional shape.

A splitting element 130 is placed downstream of the light emitting device 120. The splitting element 130 spreads out the beam of light 122 from a cross-sectional pattern of the beam of light 124 to a multi-order pattern 132. The zero and first order patterns from 132 have the cross-sectional shape 134, which is predominately directed about the optical axis 114. In various exemplary embodiments, the splitting element 130 creates a circular pattern having sixteen equiangularly spaced spots of equivalent intensity. Also in various exemplary embodiments, the splitting element 130 causes the beam of light 122 to diverge at an angle of 3.8° upon passing through the splitting element 130. However, it should be appreciated that the beam of light 122 can be split up into any pattern made of various spots or shapes and diverge into various patterns and/or diverge at any appropriate angle in order to produce a desired pattern for the beam of light 112 to be directed at the workpiece 102.

The illuminating apparatus 110 also includes a lens 140 located downstream from the splitting element 130. In various exemplary embodiments, the lens 140 is placed at its focal length from the splitting element 130. The location of the lens 140 is chosen to produce a near-collimated beam of light 142 that has the cross-sectional shape 144. In particular, the diameter of the beam of light 142 should be smaller than the smallest diameter for all lenses used within the optical system 200 such that the beam of light 142 can be directed into all lenses used within the optical system 200 without occlusion. It should also be appreciated that the location of the lens 140 is also chosen to produce a desired diameter for the beam of light 142.

In various exemplary embodiments, a mirror can be used instead of the lens 140. However, it should be appreciated that any optical element can be used to produce the beam of light 142 so that the beam of light 142 preferably has a diameter smaller than the smallest diameter for all of the objective lenses used with the optical system 200 and so that the diameter of the beam of light 142 is in accordance with the magnification of the optical system 200.

A filter 150 is placed downstream of the lens 140 to block all second and higher order patterns of the beam of light 142 from being transmitted into the optical system 200. A second filter 160 is placed downstream of the filter 150. The filter 160 includes an obscuration area 162 and a mirrored surface 164. The filter 160 blocks changes in the direction and intensity of the zeroth order beam from the beam of light 152 from the filter 150 and any unnecessary scattering of the beam of light 152 caused by the splitting element 130. The obscuration area 162 removes light from the central portion of the beam of light 152 to create the beam of light 112 having the cross-sectional shape 166. However, it should be appreciated that the obscuration area 162 can be of any size or shape that is usable to remove a desired amount of the beam of light 152 to create a desired pattern. It should also be appreciated that any other set of one or more optical elements can be used to produce the beam of light 112 having a useful cross-sectional shape such as the shape 166 shown in FIG. 1.

The surface 164 reflects the remaining beam of light 112 out of the illuminating apparatus 110 and into the optical system 200. In various exemplary embodiments, the surface 164 has an annular shape that reflects the beam of light 112. However, it should be appreciated that any surface or other optical element may be used to reflect or otherwise direct the beam of light 112 into the optical system 200.

In various exemplary embodiments, the splitting element 130, lens 140 and filter 150 can be replaced by a scanning galvanometer followed by a collimating lens, to scan out cross-sectional shape 166 at high frequency. However, it should be appreciated that any device, currently available or later developed can be used, so as to project a beam of light 112 having a cross sectional shape such as the shape 166 into the optical system 200.

The optical system 200 may include through-the-lens workpiece illumination by means of an arm 210. The optical system 200 also includes an optical tube 220 adjacent to the arm 210. A beam splitter 212 is located within the arm 210. The beam splitter 212 receives the beam of light 112 from the illuminating apparatus 110. The beam splitter 212 also receives incoming light from a light source 214 along an optical axis 216. The beam splitter 212 combines the beam of light 112 received from the illuminating apparatus 110 and the light from the light source 214 into a composite beam of light 218. The beam splitter 212 directs the composite beam of light 218 into the optical tube 220 of the optical system 200.

In various exemplary embodiments, the beam splitter 212 is in tune with the wavelengths of the light emitting devices 120 and 214. In this manner, when the beam splitter 212 receives the light from the light source 214, the amount of light from the light source 214 combined by the beam splitter 212 into the composite beam of light 218 can be maximized, while the amount of light from the beam of light 112 combined by the beam splitter 212 into the composite beam of light 218 can also be maximized. However, it should be appreciated that any process currently known or later developed can be used to maximize the amount of light from the beam of light 112 injected into the optical tube 220 while also maximizing the amount of light from the light source 214 injected into the optical tube 220.

A second beam splitter 222 is located within the optical tube 220. The location of the beam splitter 222 is chosen to reflect the composite beam of light 218 to become a composite beam of light 224. The second beam splitter 222 also aligns the composite beam of light 224 with an optical axis 226 of the optical system 200. In various exemplary embodiments, the beam splitter 222 transmits and reflects a portion of the composite beam of light 218 based on plane polarization of light, as a means of controlling the intensity to the reflected composite beam of light 224. In various exemplary embodiments, when the composite beam of light 218 interacts with a polarizing version of beam splitter 222, approximately 50% of the energy from the composite beam of light 218 is reflected and approximately 50% of the energy from the composite beam of light 218 is transmitted. However, it should be appreciated that any percentages can be provided with the polarizing beam splitter such that a desired energy from the composite beam of light 218 can be reflected or otherwise redirected upon the workpiece 102. Likewise any other set of optical elements can be used to redirect the composite beam of light 218 to illuminate the workpiece 102.

The optical system 200 also includes a lens 225 and a lens system 230. In lens system 230, the location and number of elements is chosen so that the lens system 230 adequately magnifies a field of view 235 on the workpiece 102. In various exemplary embodiments, the lens system 230 can be moved from the optical tube 220 and replaced by another lens system having one or more different sets of lens elements to provide different magnifications. Furthermore, the composite beam of light 224 passes through the lens 225 and lens system 230. Lens system 230 is constructed according to conventional optical design principles, and any construction which provides the required attributes described herein is suitable. In various exemplary embodiments, the diameter of the composite beam of light 224 is smaller than the entrance pupil diameter of the lens 225.

When through-the-lens workpiece illumination is used, the lens system 230 transmits the portion of the composite beam of light 224 obtained from the light source 214 onto the workpiece 102 to illuminate the workpiece, and particularly the field of view 235 of the image acquisition device 250, so that an image of the workpiece can be acquired by an image acquisition device 250 of the optical system 200. The lens system 230 also transmits the indicating portion of the composite beam of light 224 obtained from the illumination system 110, which is projected from lens system 230 as indicating portion 234 to indicate to a user the region of the workpiece 102 that is currently within the field of view 235 of the image acquisition device 250. In various exemplary embodiments, the lens system 230, in addition to providing the function of a conventional microscope objective lens system, includes a lens arrangement with the lens 225 which focuses the indicating portion of the composite beam of light 224 at or near the pupil plane of the included microscope objective lens system, such that as the composite beam of light 224 propagates through the lens system, it falls outside of the field of view 235 at a maximum possible diameter for the indicator portion 234. However, any lens arrangement can be used which causes the indicating portion to fall outside the field of view, while providing a desired magnification of the field of view. In the exemplary embodiment shown in FIG. 1, the indicating portion 234 occupies an annulus outside of and surrounding the field of view 235. That is, in this and other exemplary embodiments, the field of view 235 on the workpiece 102 that is projected by the optical system 200 onto the image acquisition device 250 does not include the indicating portion 234. With this arrangement, the indicating portion 234 may be constantly illuminated.

Light from the field of view 235 is reflected from the workpiece 102 along the optical axis 226 to the image acquisition device 250. In various other exemplary embodiments, the light from the indicating portion 234 lies within the field of view 235 and is also reflected from workpiece 102 along the optical axis 226 to the image acquisition device 250. In these exemplary embodiments, the indicating portion 234 is strobed ON for indicating the field of view of the image acquisition device 250 and strobed OFF when using the image acquisition device 250 to acquire an image of the field of view from the workpiece 102. The strobing may be achieved by conventional electronic switching techniques which control the light emitting device 120. In various exemplary embodiments the strobing may be continuously synchronized to be OFF during the image acquisition device's periodic image acquisition and ON at other times; or it may be normally OFF and manually controlled by the user to be ON when the user requires an indication of the field of view.

In various exemplary embodiments, a lens 240 is placed along the optical axis 226. The lens 240 magnifies the portion of the image of the workpiece 102 passed by the lens system 230. The magnified portion 242 of the light beam reflected from the workpiece 102 and passed by the lens system 230 is projected onto the image acquisition device 250. The image acquisition device 250 acquires the image of the workpiece 102. In various exemplary embodiments, the image acquisition device 250 is a charge-coupled device. However, it should be appreciated that an image of the workpiece 102 can be acquired using any known or later developed image acquisition method or apparatus. In various other exemplary embodiments not shown, the image acquisition device may be replaced by an eyepiece for use as a conventional microscope, or a branch image may be split off along the optical path and directed along a separate path to an eyepiece for use as a conventional microscope in parallel with an electronic image acquisition device.

In various exemplary embodiments the workpiece 102 is placed on a table (not shown). In these exemplary embodiments, at least one of the table and the optical system 200 are movable to alter the location of the workpiece 102 relative to the optical system 200.

As shown in the embodiment of FIGS. 2 and 3, the indicating portion 234 is output from the lens system 230. Located inside the zone circumscribed by indicating portion 234 is the portion of the workpiece 102 within the field of view 235 of the image acquisition device 250. As indicated above, in various exemplary embodiments, the field of view 235 and the indicating portion 234 are positioned such that the indicating portion 234 does not fall within the field of view 235 of the image acquisition device 250. In FIG. 3, the indicating portion 234 is shown as slightly diverging due to the construction of optical system 200 and illumination apparatus 110. However in various other embodiments, the indicating portion 234 may be either converging or diverging near the workpiece 102, and the configuration of FIG. 2 may still be achieved. Furthermore, by proper construction of optical system 200 and illumination apparatus 110, it may advantageously be provided that the diameters of indicating portion 234 and field of view 235 shrink or grow in concert, when the magnification provided by lens system 230 is changed. Thus, the benefits of the embodiment shown in FIG. 2 and FIG. 3 are retained while the indicator portion 234 shrinks in diameter to discriminate a smaller field of view 235 at higher magnifications.

Figure 4:
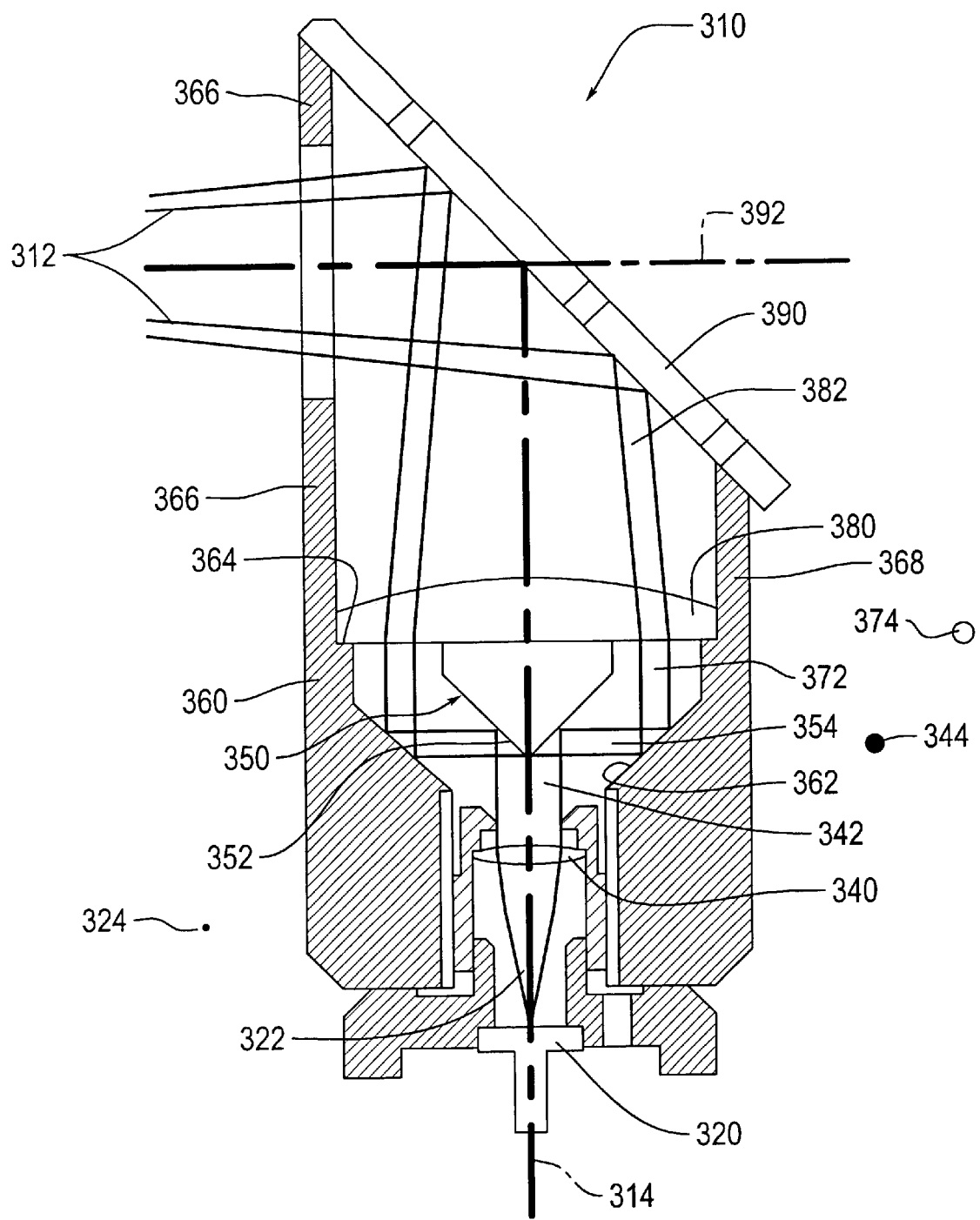
FIG. 4 shows a second exemplary embodiment of an apparatus that creates a predetermined beam of light according to this invention.
Figure 5:
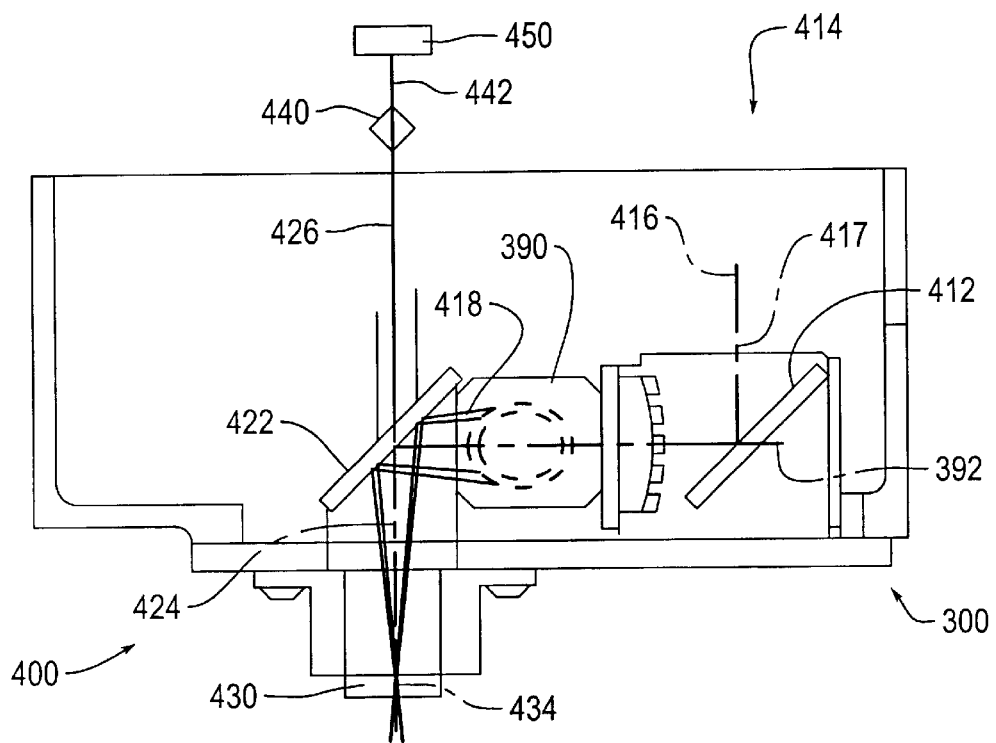
FIG. 5 is a side view of a second exemplary embodiment of an imaging system that indicates the location of the field of view on the subject workpiece according to this invention.
Figure 6:
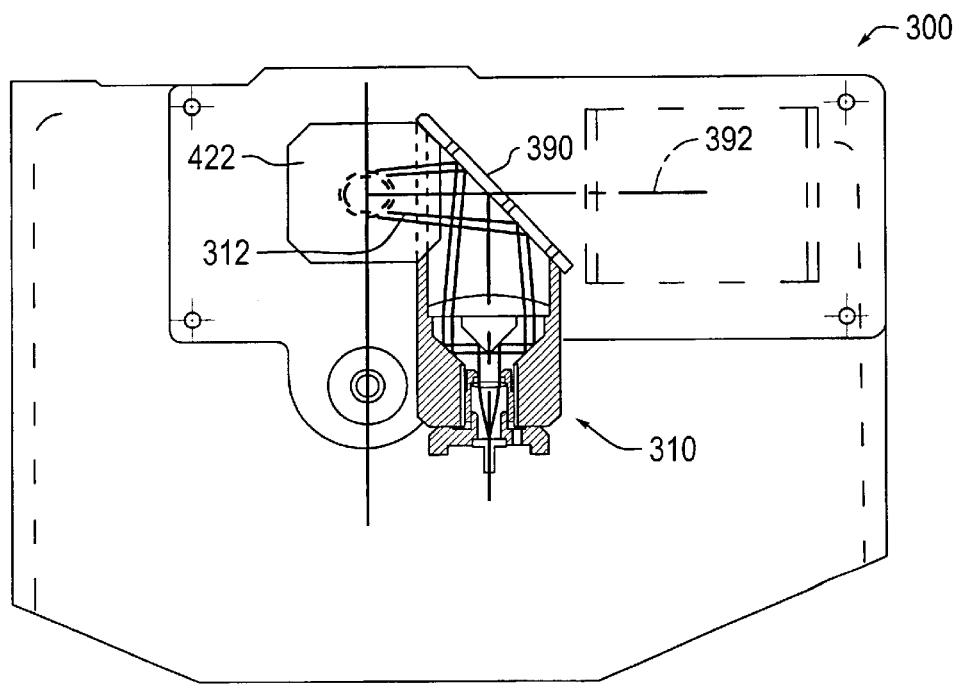
FIG. 6 is a top view of the second exemplary embodiment of the imaging system that indicates the location of the field of view on the subject workpiece according to this invention incorporating the apparatus of FIG. 4.

FIGS. 4–6 illustrate a second exemplary embodiment of an imaging system 300 that indicates the location of a field of view on a subject workpiece (not shown) according to this invention. As shown in FIG. 4, an illumination apparatus 310 includes a light emitting device 320 that emits a beam of light 322 along an optical axis 314. As shown in FIGS. 5 and 6, the imaging system 300 includes the illumination apparatus 310 that creates a beam of light 312 and an optical system 400.

In various exemplary embodiments, the light emitting device 320 is a semiconductor laser or light emitting diode.

Also in various exemplary embodiments, the illumination apparatus 310 can comprise a plurality of light emitting devices 320 in order to create a pattern for the beam of light to be projected into the optical system 400. However, it should be appreciated that the light emitting device 320 can be any currently known or later developed device or arrangement of devices that can emit electromagnetic radiation, preferably in a highly directional manner. In general, the beam of light 322 is in a region of the visible spectrum. However, any type of electromagnetic radiation that creates an indication, on an object to be viewed, of the field of view of the imaging system 300 that is visible to the human eye, whether aided or unaided, can be used. Thus, if the object to be viewed fluoresces visible light under a particular type of electromagnetic radiation, or if a particular type of electromagnetic radiation can be viewed using an aid to the human eyes, such as night vision, infrared or ultraviolet glasses, the light emitting device 320 can emit that type of electromagnetic radiation. In various exemplary embodiments, the beam of light 322 is circular with a known diameter, as indicated by the cross-section 324. For illustrative purposes, the beam of light 322 will be described below as having a circular cross sectional pattern. However, it should be appreciated that the beam of light 322 can be of any appropriate cross-sectional pattern.

If the light emitting device 320 is a diode laser, the light may diverge from the diode laser in an elliptical cross-section. Lenses (not shown)may be provided on the output of the light emitting device 320 to make the transformation from elliptical to circular shape. The illuminating apparatus 310 also includes a lens 340 located downstream from the light emitting device 320. The location of the lens 340 is chosen to produce a beam of light 342 that has the cross-sectional shape 344. It should also be appreciated that the focal length and location of the lens 340 is also chosen so as to produce a desired diameter for the beam of light 342. In various exemplary embodiments, a mirror can be used instead of the lens 340. However, it should be appreciated that any optical element can be used to produce the beam of light 342 so that the beam of light 312 has a desired profile as it passes through the optical system. Preferably, at each stage, the beam of light 312 has a diameter smaller than the entrance pupil diameter for all of the objective lenses used with the optical system 400 and so that the diameter of the beam of light 342 is in accordance with the magnification of the optical system 400.

A reflector 350 is placed downstream of the lens 340. The reflector 350 reflects the beam of light 342 at a point of reflection. As such, the beam of light 342 reflects at a predetermined angle around the point of reflection. In various exemplary embodiments, the reflector 350 is a reflective conoid with its reflective conical annulus 352 directed toward the lens 340 and residing on the axis 314. The point of reflection is located surrounding the tip of the reflective conical annulus 352. In various exemplary embodiments, the reflector 350 radially reflects the beam of light 342 at a 90° angle from the axis 314 to create a full 36 ° fan of radially directed light 354 about the axis 314. In various exemplary embodiments, the reflector 350 is a mirrorized glass cone. However, it should be appreciated that the reflector 350 can be of any chosen shape and made of any known or later developed material usable to reflect the beam of light 342 in the appropriate direction(s) around the point of reflection.

A housing 360 surrounds the reflector 350. The housing 360 includes a surface 362 for reflecting the radially directed light 354. The diameter and reflection angle of the surface 362 is chosen to produce a beam of light 372 that has a cross sectional shape 374. In various exemplary embodiments, the surface 362 is a mirror-finish turned conical surface which reflects the beam of light 354. However, it should be appreciated that any suitable known or later developed optical element can be used to produce the beam of light 372 from the radially directed light 354.

A lens 380 is located downstream from the surface 362. The focal length and location of the lens 380 is chosen to produce a beam of light 382 from the beam of light 372. In particular, the lens 380 reduces the diameter of the beam of light 372 to produce the converging beam of light 382. In various exemplary embodiments, the lens 380 is attached to the reflector 350. In various other exemplary embodiments, the lens 380 is mounted onto a ledge 364 of the housing 360. In various exemplary embodiments, the inside diameter of the ledge 364 is smaller than the outside diameter of the lens 380.

An optical element 390 is placed downstream of the lens 380, positioned against extensions 366 and 368. The optical element 390 reflects at least a portion of the beam of light 382 into the optical system 400 along an optical axis 392 to form the beam of light 312. The housing 360 has a first extension 366 that is longer relative to a second extension 368 such that the optical element 390 reflects the beam of light 382 along the optical axis 392. In various exemplary embodiments, the optical element 390 is attached to the extensions 366 and 368 of the housing 360.

As shown in FIG. 5, the optical system 400 may include through-the-lens workpiece illumination. A mirror 412 receives incoming light 417 from a light source 414 along an optical axis 416. The mirror 412 redirects the light 417 from the light source 414 along the optical axis 392. After the mirror 412 redirects the light 417 from the light source along the optical axis 392, the light 417 from the light source 414 is combined with the beam of light 312 from the illuminating apparatus 310 into a composite beam of light 418 with the aid of the optical element 390.

In various exemplary embodiments, the optical element 390 is a beam splitter. The beam splitter 390 is in tune with the wavelengths of the light emitted by the light emitting devices 320 and 414. In this manner, when the beam splitter 390 receives the incoming light 417 from the light source 414, the amount of incoming light 417 from the light source 414 combined with the beam of light 312 to form the composite beam of light 418 can be maximized while the amount of light from the beam of light 312 combined with the incoming light 417 from the light source 414 to form the composite beam of light 418 can also be maximized. However, it should be appreciated that any process currently known or later developed can be used to maximize the amount of light from the beam of light 312 used to form the composite beam of light 418 while also maximizing the amount of incoming light 417 from the light source 414 used to form the composite beam of light 418.

A second beam splitter 422 is located downstream of the optical element 390. The location of the beam splitter 422 is chosen to reflect the composite beam of light 418 to become a composite beam of light 424. This second beam splitter 422 also aligns the composite beam of light 424 with an optical axis 426 of the optical system 400. In various exemplary embodiments, the beam splitter 422 transmits and reflects a portion of the composite beam of light 418 based on plane polarization of light, as a means of controlling the intensity to the reflected composite beam of light 424. In various exemplary embodiments, when the composite beam of light 418 interacts with a polarizing version of beam splitter 422, approximately 50% of the energy from the composite beam of light 418 is transmitted and approximately 50% of the energy from the composite beam of light 418 is reflected. However, it should be appreciated that any percentage can be provided with the polarizing beam splitter such that a desired energy from the composite beam of light 418 can be reflected or otherwise redirected upon the workpiece. Likewise, any other set of optical elements can be used to redirect the composite beam of light 418 to illuminate the workpiece.

The optical system 400 also includes a lens system 430 (not shown to scale). The composite beam of light 424 is directed towards the lens system 430. The location and number of lens elements is chosen so that the lens system 430 adequately magnifies a field of view on the workpiece. In various exemplary embodiments, the lens system 430 can be removed from the optical system 400 and replaced by another lens system having one or more different sets of lens elements.

When through-the-lens workpiece illumination is used, the lens system 430 transmits the portion of the composite beam of light 424 obtained from the light source 414 onto the workpiece to illuminate the workpiece, and particularly the field of view of an image acquisition device 450 so that an image of the workpiece can be acquired by the image acquisition device 450 of the optical system 400. The lens system 430 also transmits the indicating portion 434 of the composite beam of light 424 obtained from the illumination system 310 to indicate to a user the region of the workpiece that is currently within a field of view of the image acquisition device 450. In the exemplary embodiment shown in FIG. 5, the indicating portion 434 diverges as it is transmitted through the lens system 430 and finally occupies an annulus outside of and surrounding the field of view of the image acquisition device 450 on the workpiece. That is, in this and other exemplary embodiments, the field of view on the workpiece that is projected by the optical system 300 onto the image acquisition device 450 does not include the indicating portion 434. With this arrangement, the indicating portion 434 may be constantly illuminated.

Light from the field of view is reflected from the workpiece along the optical axis 426 to the image acquisition device 450. In various other exemplary embodiments, the light from the indicator portion 434 is also reflected from the workpiece along the optical axis 426 to the image acquisition device 450. In these exemplary embodiments, the indicating portion 434 is strobed ON for indicating the field of view of the image acquisition device 450 and strobed OFF when using the image acquisition device 450 to acquire an image of the field of view from the workpiece. The strobing may be achieved by conventional electronic switching techniques which control the light emitting device 320. In various exemplary embodiments the strobing may be continuously synchronized to be OFF during the image acquisition device's periodic image acquisition and ON at other times; or it may be normally OFF and manually controlled by the user to be ON when the user requires an indication of the field of view.

In various exemplary embodiments, a lens 440 is placed along the optical axis 426. The lens 440 magnifies the portion of the image of the workpiece passed by the lens system 430. The magnified portion 442 of the light beam reflected from the workpiece and passed by the lens system 430 is projected onto the image acquisition device 450. The image acquisition device 450 acquires the image of the workpiece. In various exemplary embodiments, the image acquisition device 450 is a charge-coupled device. However, it should be appreciated that an image of the workpiece can be acquired using any known or later developed image acquisition method or apparatus. Furthermore, it should be appreciated that the term "image" as employed herein may also refer to a subset of an overall image acquired by an electronic imaging array, a line scan array, or the like. Furthermore, it should be appreciated that the term "field of view" of an image acquisition device as employed herein may also refer to a selected subset of an overall field of view of an image acquisition device such as an electronic imaging array, a line scan array, or the like. In such a case, "field of view" refers to the "effective" field of view of the image acquisition device, which is intended to be used for acquiring image information for the purposes of measurement or observation, and is therefore intended to exclude the disruptive effects of the indicator light.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for indicating the location of the field of view of an imaging system on an object, comprising:

generating an indicator light from at least one light source;

transmitting the indicator light along a projection path; and outputting the indicator light from the projection path onto the object, wherein the projection path includes at least a portion of the imaging system optical path for imaging a workpiece and the indicator light is projected in a region indicative of, but not included within, the field of view of the imaging system.

2. The method of claim 1, wherein the indicator light circumscribes the field of view of the imaging system.

3. The method of claim 1, wherein the at least one light source comprises a plurality of light sources arranged to form a prescribed pattern.

4. The method of claim 1, further comprising the step of forming the indicator light into a prescribed pattern.

5. The method of claim 4, wherein the prescribed pattern is formed in a shape that circumscribes the field of view.

6. The method of claim 5, wherein the prescribed pattern is circular.

7. The method of claim 4, wherein the indicator light is formed by collimating the indicator light and spatially filtering the collimated light to form the prescribed pattern.

8. The method of claim 4, wherein the indicator light is formed by quasicollimating the indicator light and spatially filtering the collimated light to form the prescribed pattern.

9. The method of claim 1, further comprising the step of receiving at least one image output from the imaging system optical path with an image acquisition device, wherein the indicator light is excluded from the received at least one image.

10. The method of claim 9, wherein the indicator light is excluded from the received at least one image by outputting the indicator light onto the object in a region outside the field of view of the image acquisition device.

11. The method of claim 9, further comprising the step of strobing the indicator light off when the image acquisition device receives the at least one image.

12. An apparatus that indicates a location of a field of view of an imaging system on an object, comprising:

a light source that generates an indicator light; and a projection path that directs the indicator light onto the object;

wherein the indicator light is output from the projection path and wherein the projection path includes at least a portion of the imaging system optical path for imaging a workpiece and the indicator light is projected in a region indicative of, but not included within, the field of view of the imaging system.

13. The apparatus of claim 12, further comprising an image acquisition device positioned to receive images output from the imaging system optical path.

14. The apparatus of claim 13, wherein the apparatus further comprises an indicator light switch such that the indicator light may be strobed off at selected times when the image acquisition device acquires an image of the portion of the object within the field of view.

15. The apparatus of claim 12, wherein the region surrounds the field of view of the imaging system.

16. The apparatus of claim 12, wherein the projection path comprises at least one indicator light patterning element that forms the indicator light into a prescribed pattern.

17. The apparatus of claim 16, wherein the at least one indicator light patterning element comprises a light collimating element and a spatial filter.

18. The apparatus of claim 16, wherein the at least one indicator light patterning element comprises a reflective conoid and a reflective conical annulus.

19. The apparatus of claim 12, wherein the indicator light is formed into a prescribed pattern.

20. The apparatus of claim 19, wherein the prescribed pattern is output onto the object in a region that circumscribes the field of view.

21. The apparatus of claim 20, wherein a prescribed pattern is circular.

22. The apparatus of claim 19, wherein the prescribed pattern is formed by quasi-collimating the indicator light and spatially filtering the quasi-collimated indicator light.

23. The apparatus of claim 12, wherein the light source is a plurality of light sources arranged to form a prescribed pattern.

24. The apparatus of claim 12, wherein the object is placed on a table, and at least one of the table and the imaging system optical path is movable relative to the other.

* * * * *

UNITED STATES PATENT AND TRADEMARK OFFICE
CERTIFICATE OF CORRECTION

PATENT NO. : 6,498,684 B1
DATED : December 24, 2002
INVENTOR(S) : Paul G. Gladnick et al.

It is certified that error appears in the above-identified patent and that said Letters Patent is hereby corrected as shown below:

<u>Title page,</u>
Item [75], should read:
-- [75] Inventors: Paul G. Gladnick, Seattle, WA (US); Charles R. Blanford, Kingston, WA (US); Seiji Shimokawa, Kawasaki (JP) --

Signed and Sealed this

Fifteenth Day of April, 2003

JAMES E. ROGAN
*Director of the United States Patent and Trademark Office*